March 18, 1969     W. J. SACKETT, SR     3,433,269

RAPID ACCESS CLOSURE SYSTEM FOR HOUSING

Filed Oct. 22, 1965     Sheet 1 of 2

INVENTOR
Walter J. Sackett, Sr.

BY Walter G. Finch
ATTORNEY

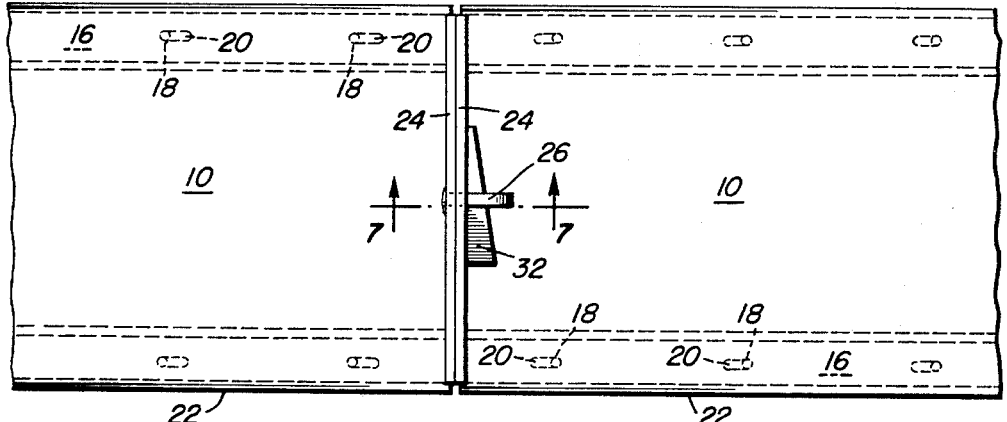
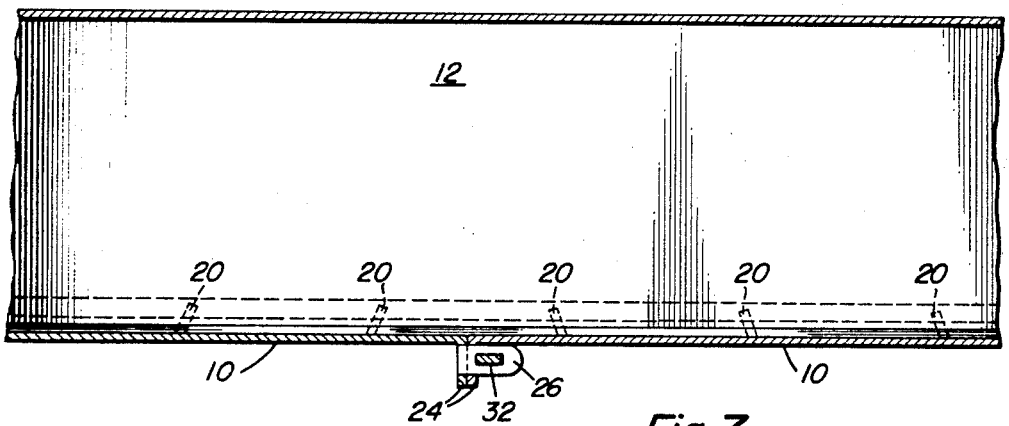
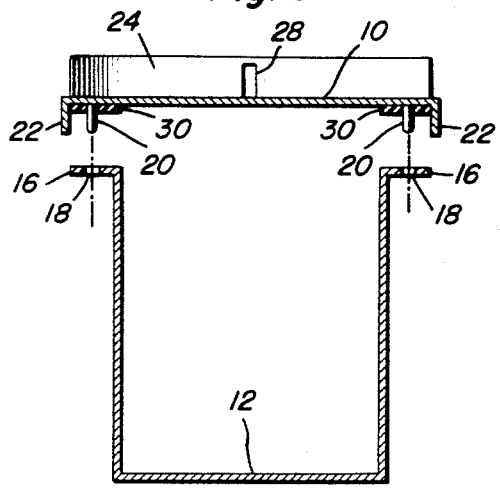
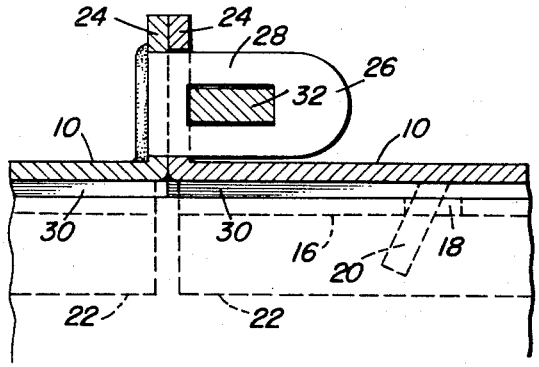
INVENTOR
Walter J. Sackett, Sr.
BY Walter G. Finch
ATTORNEY

United States Patent Office 3,433,269
Patented Mar. 18, 1969

3,433,269
RAPID ACCESS CLOSURE SYSTEM FOR HOUSING
Walter J. Sackett, Sr., Baltimore, Md., assignor to The
A. J. Sackett & Sons Co., Baltimore, Md., a corporation of Maryland
Filed Oct. 22, 1965, Ser. No. 501,802
U.S. Cl. 138—92                                   3 Claims
Int. Cl. F16l 45/00; E04c 3/32

ABSTRACT OF THE DISCLOSURE

A rapid access closure is provided for an opening in a duct having a pair of flanges defining the opening, the closure comprising a pair of covers positioned end-to-end over the opening, with the adjacent ends of the covers each having an outwardly extending flange, one of these flanges having an aperture and the other flange having a tongue extending through the aperture, with a tapered pin extending through the tongue for drawing the adjacent ends of the covers together. The flanges defining the opening in the duct each have a plurality of elongated holes therealong, with each cover having inclined pin elements extending through the elongated holes to draw the covers down onto the duct upon the drawing of the adjacent ends of the covers together.

---

This invention relates generally to closures, and more particularly it pertains to covers for housings such as ducts and chutes containing machinery such as moving conveyors and the like.

In the processing of feeds, fertilizers, flour and the like where fine powdery materials are handled by conveyors, the ducting of chutes must be covered to confine the dust. Bolted flanges and strip gaskets have been used in the past but where frequent access to the interior of the duct is required the unbolting process is very time consuming.

It is an object of this invention to provide a cover structure designed especially for occasional and ready access to the interior of ducts of thin material where leaks must be avoided.

Another object of this invention is to provide a closure for long runs of a housing whereby a minimum of loose hardware such as bolts required for a tight fitting all along the full extent of the housing.

Still another object of this invention is to provide closure elements on an elongated thin metal structure which will adapt to irregularity and twisting forces without leaking at the cover interface.

Other objects and attendant advantages of this invention will become more readily apparent and understood from the following detailed specification and accompanying drawings in which:

FIG. 4 is a top view thereof;

FIG. 5 is a longitudinal section taken on the center line of FIG. 4 but in an inverted position;

FIG. 6 is a cross sectional end view showing the cover removed; and

FIG. 7 is an enlarged section taken along line 7—7 of FIG. 4 of the latch means.

Figure 1:
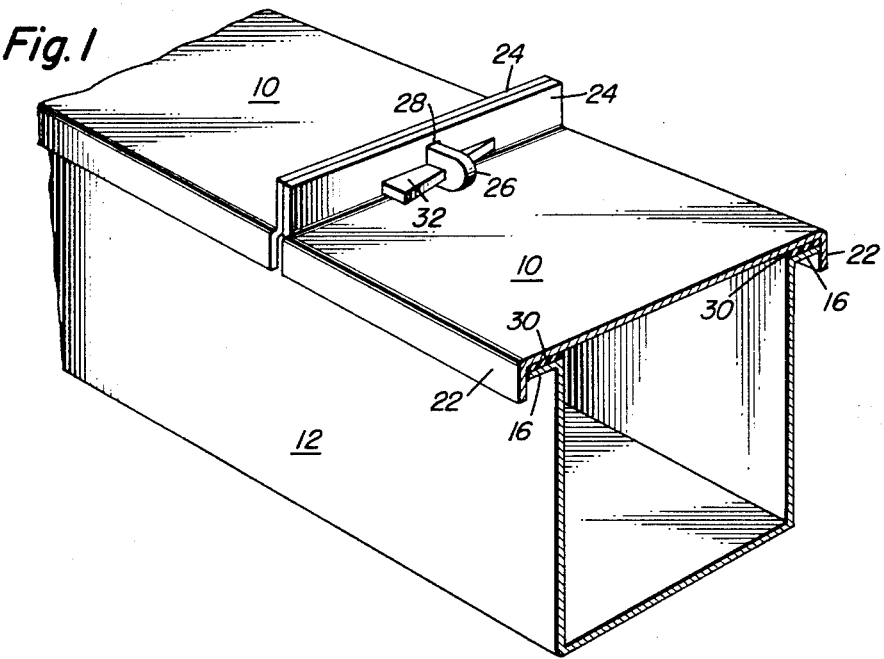
FIG. 1 is a perspective view of a portion of a chute showing the novel cover arrangement.
Figure 2:
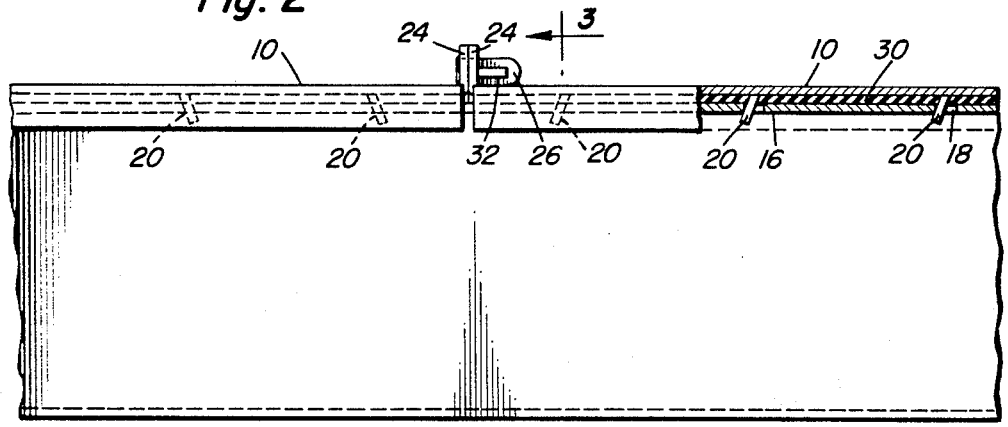
FIG. 2 is a side elevation, partly in section, of the chute of FIG. 1.
Figure 3:
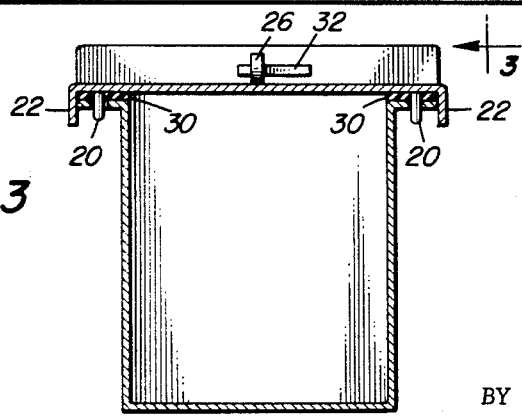
FIG. 3 is a vertical section taken on line 3—3 of FIG. 2.

Referring now to the details of the invention as shown in the drawings of FIGS. 1 to 7, reference numeral 10 indicates each of a pair of covers for a duct 12, the latter being shown rectangular in cross section but which may be U-shaped or otherwise as well. The duct 12 is provided with outwardly extending flanges 16 along its top edges. These flanges 16 are perforated with a series of holes 18 elongated parallel with the run of the duct 12.

The covers 10 have a series of pins 20 welded to them in matching relationship to the holes 18 of the duct 12. The edges of the covers beyond the pins are formed with flanges 22 to extend over the edges of the flanges 16 of the duct.

The pins 20 are all inclined at approximately 45° to 50° in a direction toward one end of each cover 10 and this end is formed upwardly into a flange 24. One of these end flanges 24 is provided with a tongue 26 and the end flange 24 of the adjacent cover 10 with a matching aperture 28.

A linear gasket 30 punched with holes to fit over the pins 20 is secured to the covers 10 on both sides abutting the flanges 22 of the covers. When the covers 10 are placed on top of the duct 12, the gaskets 30 contact the flanges 16 and the pins 20 extend through the elongated holes 18 thereof.

The tongue 26 of one cover 10 extends through the aperture 28 of the other cover 10 and a tapered closure pin 32 is driven laterally into an eye provided in tongue 26. In doing so, the covers 10 are urged toward each other and the inclined pins 20 captivate in their holes 18 and draw the gaskets 30 tightly down on the flanges of the duct 12 all along its extent.

The tapered pin 32 and eye 34 are preferably rectangular in cross section as shown in FIG. 7 so that a considerable degree of linear motion is given the covers 10 by the closure operation related. Only one element, the pin 32, is removed to release the covers as shown in FIG. 6. If desired the pin can be chained to the associated cover to prevent its loss.

If desired, the entire system can be inverted as shown in FIG. 5 so that the covers 10 can be assembled from the bottom of the duct 12, wherein it is desired to have the opening for the duct 12 therebelow. The covers 12 would still be assembled as previously described by sliding them in place and using the arrangement described in connection with FIGS. 6 and 7.

Obviously many modifications and variations of the present invention are possible in light of the above teachings. It is, therefore, to be understood that within the scope of the appended claims the invention may be practiced otherwise than as specifically described.

What is claimed is:

1. A chute structure comprising a duct having two of its sides each terminating in a longitudinal flange short of one another to define a longitudinal opening in said duct and means for closing said opening, including a pair of cover elements positioned longitudinally end-to-end over said opening and having longitudinal side flanges extending over the edges of the flange of each said sides of said duct, with the adjacent ends of said cover elements each having an outwardly extending flange, one having an aperture and the other having a tongue extending through said aperture, and a tapered closure pin for drawing said tongue through said aperture, thereby drawing said adjacent ends tightly together, each said flange of said sides of said duct having a plurality of elongated holes running longitudinally along said duct and each said cover elements having pin elements extending through said holes and inclined toward its respective adjacent end of said cover elements for drawing said cover elements tightly against said duct upon the drawing of the adjacent ends of said cover elements together.

2. The chute structure of claim 1 wherein pin elements form an angle of about 70° with said cover elements.

3. The chute structure of claim 1 and additionally, gasket means positioned between the flange of each said sides and said cover elements.

References Cited

UNITED STATES PATENTS

| | | |
|---|---|---|
| 234,725 | 11/1880 | Racouillat. |
| 494,036 | 3/1893 | Smith. |
| 627,418 | 6/1899 | Homan. |
| 1,506,442 | 8/1924 | O'Hara. |
| 2,328,823 | 9/1943 | MacKenzie _____ 52—585 X |
| 2,526,529 | 10/1950 | Arrighini et al. |
| 2,562,483 | 7/1951 | Bender. |
| 2,747,942 | 5/1956 | Kaufmann _____ 302—64 |
| 2,877,519 | 3/1959 | Propst _____ 287—20–92.5 X |
| 3,124,858 | 3/1964 | Blonde _____ 52—585 X |
| 3,144,701 | 8/1964 | Bowden _____ 52—582 X |

FOREIGN PATENTS

| | | |
|---|---|---|
| 323,701 | 8/1920 | Germany. |
| 472,875 | 10/1937 | Great Britain. |
| 498,051 | 10/1919 | France. |
| 1,127,800 | 4/1962 | Germany. |

HOUSTON S. BELL, JR., *Primary Examiner.*

U.S. Cl. X.R.

52—731; 220—29; 302—64